G. W. PICKARD.
ELECTRICAL CONDUCTION SYSTEM FOR COMMUNICATING ELECTRICAL ENERGY.
APPLICATION FILED APR. 27, 1910.
1,051,443.
Patented Jan. 28, 1913.
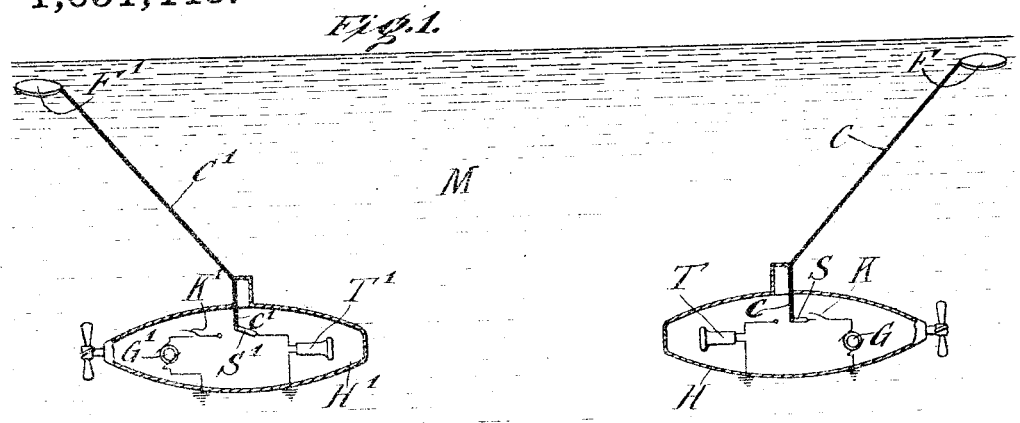
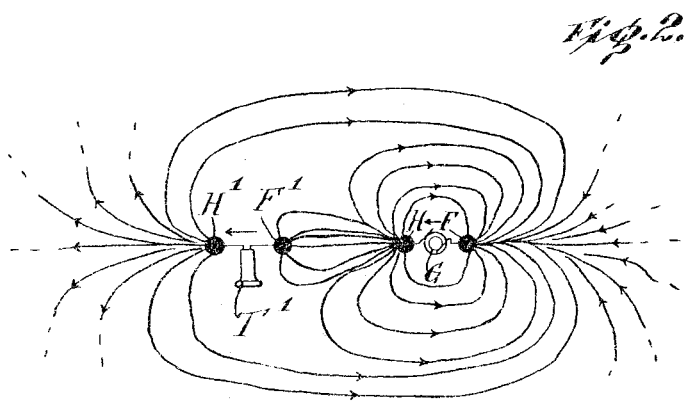
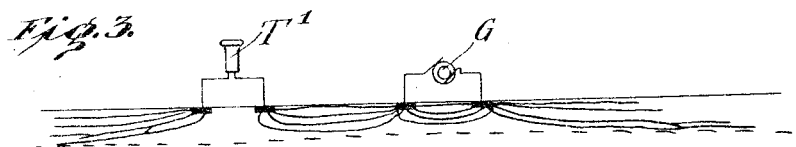
WITNESSES:
C. S. Ashley
W. J. Forbes, Jr.
INVENTOR
Greenleaf Whittier Pickard:
BY
Philip Farnsworth
ATTORNEY

UNITED STATES PATENT OFFICE.

GREENLEAF WHITTIER PICKARD, OF AMESBURY, MASSACHUSETTS, ASSIGNOR TO WIRELESS SPECIALTY APPARATUS COMPANY, OF NEW YORK, N. Y., A CORPORATION OF NEW YORK.

ELECTRICAL CONDUCTION SYSTEM FOR COMMUNICATING ELECTRICAL ENERGY.

1,051,443.  Specification of Letters Patent.  Patented Jan. 28, 1913.

Application filed April 27, 1910. Serial No. 557,959.

*To all whom it may concern:*

Be it known that I, GREENLEAF WHITTIER PICKARD, a citizen of the United States of America, and a resident of Amesbury, Massachusetts, have invented certain new and useful Improvements in Electrical Conduction Systems for Communicating Electrical Energy, the principles of which are set forth in the following specification and accompanying drawing, which disclose the form of the invention which I now consider to be the best of the various forms in which the principles of the invention may be embodied.

This invention relates to the method of effectively employing stream lines of electrical current flow on and in an electrical conductor, for communication of intelligence, etc., between stations located in said conductor.

The object of the invention is to employ such stream lines of electrical current effectively for the transmission and reception of intelligence, and to obviate certain defects common to all previous attempts to utilize such stream lines of electrical current for the purpose of communication of intelligence.

The invention consists of an improved method for setting up such electrical stream lines; and an improved method of receiving electrical energy from such stream lines.

Of the drawings, Figure 1 is a vertical section of the ocean showing two submarines equipped with the invention; and Figs. 2 and 3 are a plan and section of the electrical stream lines operating in the invention.

Heretofore, communication by means of electrical conduction, or current flow in the earth or water, has been dependent upon horizontally disposed base lines at each station, and the use of intermittent or alternating current of so low frequency that the stream lines of electrical current were enabled to spread out in all three dimensions. These prior methods were defective, both in that with horizontal base lines neutral positions could be found in which the receiving base line bridged or shunted portions of the conductor which were equipotential, thereby precluding signaling, and also in that as the stream lines from the transmitting base line spread out in three dimensions, much in the manner of the magnetic lines of force about a bar magnet, their intensity diminished approximately as the inverse cube of the distance, rendering long distance signaling impossible, without the employment of prohibitive amounts of energy.

My method depends upon the establishment of alternating electrical currents on and in the conducting medium, these currents only penetrating the medium to a depth sufficient to reach the receiving base line, and being, therefore, more nearly two-dimensional than three-dimensional in their extent. As a result, the intensity of the lines of current flow decreases approximately inversely as the square (instead of the cube) of the distance from the transmitting station, permitting long distance signaling without the use of excessive amounts of energy, as contrasted with the prior use of low frequencies and three-dimensional fields of stream lines.

My method further depends upon the use of base lines having a substantial vertical as well as a horizontal component, the receiving base line thereby bridging portions of the medium at different depths. Owing to what is commonly known as "skin effect", an alternating current does not penetrate a conductor to an indefinite extent, but if the frequency be sufficiently high, is chiefly confined to a surface layer, the intensity rapidly falling off as the depth is increased. A conductive base line, bridging portions of different depths in a conductor or conducting medium carrying alternating currents, is therefore the seat of alternating electromotive forces, and currents due to the difference in intensity between such different depths.

Fig. 1 shows my method applied to the case of signaling between submarine boats. Two boats are shown, at left and right respectively, each completely and alike equipped for both sending and receiving, the equipment of the boat at the left being lettered similarly to that at the right, but with prime exponents. Of that at the right, hereinafter described as sending (and that at the left as receiving) F is a conducting float, not insulated from conducting medium M, trailing behind and above the submarine boat at the end of a conductor C insulated (as indicated by its solid black line) from conducting medium M and connected to F and S, all constituting a base line having a substantial vertical component. This conductor is connected, by means of a switch S, either with an alternating current generator G, and make-and-break key K, or, as desired alternately, with a low-resistance telephone T, the circuit being completed in either case through the metal hull H of the submarine boat. The functions of float F are to maintain the difference in level of the top and bottom of conductor C, and to hold it in its inclined position, and also when desired, to provide a large conducting surface in contact with medium M, to more effectively use the stream lines, in coöperation with the metal surface H of the boat. Float F may be of any desired construction for these purposes. As shown, conductor C may be supported by the metallic periscope structure of the submarine. In the case of an installation on a battleship, the "float" would be a "sinker." Of course the larger conductor F is, the more stream lines it will intercept. When the sending key K is depressed, alternating currents flow through the circuit G, K, S, C, F, body of water M, and H, at the transmitting station. These currents, in that portion of the circuit including the liquid conductor M between F and H, spread out very widely, in the form of stream lines on and near the surface of the water. At the distant (receiving) station, the base line F¹, T¹, H¹ (also having a substantial vertical component), shunts some of these stream lines, and the resultant electrical current operates the telephone receiver T¹. The form of these stream lines, in the horizontal plane, is shown in Fig. 2. Here the sending base line F, H includes the generator G, and the arrows on the stream lines indicate their instantaneous direction. The distant base line F¹, H¹ intercepts a few of these stream lines, which flow through the telephone T¹.

In Fig. 3 is shown the vertical section of the stream lines of Fig. 2. The dotted line marks the limit below which they do not appreciably penetrate into the body of water. The particular frequency which should be chosen depends upon the specific resistance of the liquid or other conducting medium intervening between the stations, and the depth to which the stations are immersed in this medium. An alternating electrical current penetrates a conductor to a depth proportional to:

$$\frac{1}{\sqrt{2\pi\upsilon kn}}$$

where $\upsilon$ is the magnetic permeability of the conductor, $k$ the conductivity of the conductor $n$ the number of alternations per second. Thus, for a copper conductor, the depth of effective surface stratum is given by Gray, (*Absolute Measurements in Electricity and Magnetism*, page 338, Vol. II, part 1).

| Frequency of alternation. | Depth in centimeters. |
|---|---|
| 80 p. p. s. | .719 |
| 120 " | .587 |
| 160 " | .509 |
| 200 " | .455 |

If the medium were ordinary salt sea water, with a specific conductivity approximately four million times smaller than copper, the depth of the effective surface stratum would be two thousand times greater, or, for a frequency of 200 periods per second, approximately nine meters. Now, the term "effective surface stratum" simply means the depth of the stratum in which all the current would be concentrated, if the intensity were uniform. So, the current intensity will in the above case be greatest at the surface, and will rapidly decrease with depth, becoming inappreciable at a depth of two or three times that of the effective surface stratum, or, say, about twenty-five meters.

In the practical use of my method between submarine boats, inasmuch as the greatest normal depth of submersion is about twenty meters, and the float F can always be maintained within about centimeters or less of the surface, a frequency four times as great can be used, or 800 periods per second. With this frequency, the effective surface stratum becomes approximately five meters thick, and the current intensity inappreciable at a depth of about twelve or fifteen meters. Thus, with the conducting hull H at a depth always greater than ten meters, the difference in intensity at H will be markedly different from that at F, always at less than ten meters, so as to cause the receiving base-line F¹, H¹ of the left hand boat equipment of Fig. 1, to be the effective seat of alternating electro-motive forces and currents, due to the difference in intensity at the different levels of F¹ and H¹.

No limit is set to the uses and modes of use of the invention, and the application of its principles to various uses and modes of use will be obvious to those skilled in the art. The particular disclosure hereof is of an installation made by me upon submarines of the United States Navy.

I claim:

1. A base-line for receiving electrical energy transmitted through large bodies of water, which comprises a submarine vessel having a substantially large conducting surface in contact with the water; a float having a substantially large conducting surface in contact with the water at a higher level than the conducting surface of the submarine; and a connection between said float and submarine, said connection electrically connecting the said conducting surfaces of the float and submarine, but being insulated from the water for a substantial distance between said conducting surfaces.

2. A base-line for receiving electrical energy transmitted through large bodies of water, by conduction in the form of alternating current stream-lines, which comprises a vessel having a substantially large conducting surface in contact with the water and exposed to the stream-lines; an auxiliary body having a substantially large conducting surface also in contact with the water but at a depth different from that of the conducting surface of the vessel but also exposed to the stream-lines; one of said conducting surfaces being near the surface of the water; and a connection between said vessel and said auxiliary body, said connection electrically connecting the conducting surfaces of said vessel and auxiliary body, but being insulated from the water for a substantial distance between said conducting surfaces and thereby removed from direct action of the stream lines.

3. A base-line for receiving electrical energy transmitted through large bodies of water by conduction in the form of alternating current stream-lines, which comprises a body having a substantially large conducting surface in contact with the water near the surface thereof and exposed to the stream-lines; a second body having a substantially large conducting surface also in contact with the water but at a greater depth than the conducting surface of the first body and also exposed to the stream-lines; and a conductor electrically connecting said conducting surfaces of both said bodies, but insulated from the water for a substantial distance between said conducting surfaces and thereby removed from direct action of the stream lines.

4. A base-line for receiving electrical energy conducted through a medium in the form of alternating-current stream-lines, said base-line consisting of a receiving conductor having one end exposed to the stream-lines near the surface of the conducting medium, and its other end exposed to the stream-lines at a greater depth in the medium, said conductor being insulated from the medium for a substantial distance between its said exposed ends.

5. Means for the communication of electrical energy by conduction, which comprises means for producing alternating-current stream-lines in the conductive medium, and chiefly confining the same in a thin sheet substantially at the surface of the medium; and a base-line receiving-conductor having one end exposed to the stream-lines near the surface of the conducting medium, and its other end exposed to the stream-lines at a greater depth in the medium, said conductor being insulated from the medium for a substantial distance between its said exposed ends.

6. The method of communicating electrical energy by conduction, which consists in producing alternating-current stream-lines in the conducting medium, and exposing the ends of a receiving conductor, otherwise insulated from the medium, to stream-lines of different intensity at different levels in the medium, and thereby setting up alternating electromotive forces and currents in said receiving conductor.

7. The method of communicating electrical energy by conduction, which consists in producing alternating-current stream-lines of a frequency sufficiently high to chiefly confine the stream-lines to a surface layer of the conducting medium; and exposing the ends of a receiving conductor, otherwise insulated from the medium, one end to the stream-lines in the medium near the surface thereof and the other end to the stream-lines at a greater depth in the medium.

8. The method of communicating electrical energy by conduction through large bodies of water, which consists in producing in the water alternating-current stream-lines of a frequency sufficiently high to chiefly confine the stream-lines to a surface layer of the water, thereby permitting communication over long distance without excessive amounts of energy; and then causing the differing intensities of stream-lines at different levels of the water at the place of reception, to set up alternating electromotive forces and currents in a receiving conductor.

9. The method of communicating electrical energy by conduction through the salt waters of the oceans, which consists in producing alternating-current stream-lines in the water, of a frequency of the order of hundreds of periods per second, and thereby chiefly confining the lines to a surface layer of the water, whereby the intensity of the lines of current flow decreases approximately only as the inverse square of the distance of communication, and said distance can be considerable without the use of excessive amounts of electrical energy; and then causing the differing intensities of stream-lines at different levels of the water at the place of reception, to set up alternating electromotive forces and currents in a receiving conductor.

10. The method of communicating electrical energy by conduction through a conducting medium, which consists in producing in the medium stream-lines of current of such high frequency as substantially confines them to a layer of the medium near the surface thereof, in which latter the lines of greater intensity are nearer the surface; and then causing the difference in intensity between the stream-lines of upper and lower levels at a place of reception, to set up alternating electromotive forces and currents in a receiving conductor.

GREENLEAF WHITTIER PICKARD.

Witnesses:
 EDWARD H. ROWELL,
 MAYRA S. ROWELL.